Figure 1:
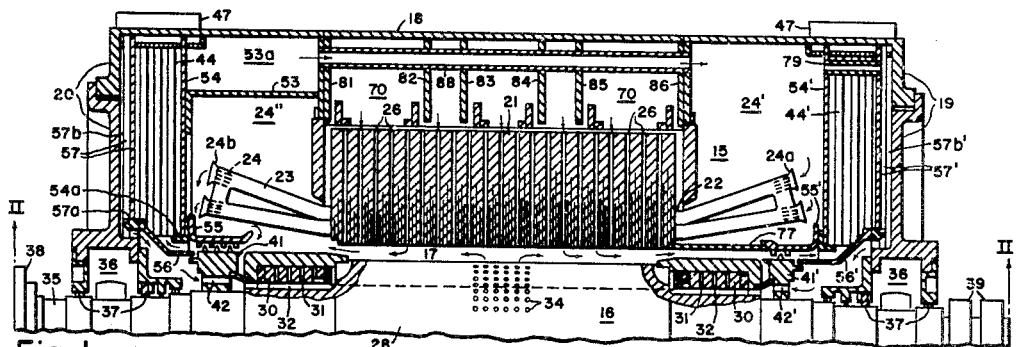

April 26, 1955  L. A. KILGORE ET AL  2,707,244
MULTIPLE-PRESSURE BLOWER-SYSTEM FOR GENERATORS
Filed Nov. 27, 1953

United States Patent Office 2,707,244
Patented Apr. 26, 1955

2,707,244

MULTIPLE-PRESSURE BLOWER-SYSTEM FOR GENERATORS

Lee A. Kilgore, Export, René A. Baudry, Pittsburgh, and Paul R. Heller, Irwin, Pa., assignors to Westinghouse Electric Corporation, East Pittsburgh, Pa., a corporation of Pennsylvania Application November 27, 1953, Serial No. 394,622

18 Claims. (Cl. 310—57)

Our invention relates to inner-cooled hydrogen-cooled turbine-generators, or similar dynamoelectric machines. It has particular relation to improvements in the generator-cooling which is described and claimed in a companion application of the applicants Baudry and Heller, Serial No. 394,602, filed November 27, 1953, in which the air gap of the machine is sufficiently large to act as a hot-gas collecting-chamber and as an axial duct for a substantial portion of the ventilating-gas of the machine.

In inner-cooled generators, in which the heat of both the stator and rotor coils or windings is directly withdrawn by inner-cooling ducts, the heat which has to be removed from the stator and rotor cores is only the small quantity of heat which is produced by hysteresis and eddy currents within these structures. As a rule, the rotor-core heat is adequately removed by the inner-cooling ducts of the rotor-windings, leaving only the stator core which has to be cooled by some sort of core-cooling ventilating-passageways or spaces or ducts, to remove the relatively small quantity of heat which is generated within that core-body.

Heretofore, in inner-cooled generators, it has been customary to provide the differential gas-pressure which is required for ventilating the inner-cooled stator and rotor windings, by means of a suitable blower or blowers. In such previous systems, all of the cooling gas for the generator was compressed to the high blower-pressure which was required for the windings, and the coolant for the stator core was then throttled down, by means of suitable restrictions, to the pressure necessary for obtaining the desired limited gas-flow through the stator-core ventilating-passages. With present designs of machines, approximately half of the total gas-flow is required for the stator and rotor coils or windings, while the remaining half is used for the core. The pressure-drop through the coils or windings may be of the order of 7000 feet of gas, while the pressure-drop through the stator core may be only of the order of 2100 feet of gas.

In large machines, the power-consumption for the ventilation-system becomes quite appreciable, so that it is the principal object of our invention to reduce this power-consumption, by compressing only the inner-cooling winding-duct gas to the high blower-pressure which is required thereby, and compressing the remaining part of the gas to only the pressure-differential which is required for cooling the stator core. By thus providing a multiple-pressure fan or blower-system, where the two ventilation-paths are separately supplied with the coolant at the required gas-pressures, a savings of at least 35% may be realized in the blower-losses, or the power-requirements which are needed for operating the blowers. In a large generator requiring 50,000 C. F. M. (cubic feet per minute), this savings in hydrogen, at 45 p. s. i. g. (pounds per square inch, gauge), would amount to about 120 kilowatts, having a monetary value of about $20,000.

Two exemplary forms of embodiment of our invention are shown in the accompanying drawing.

Figure 2:
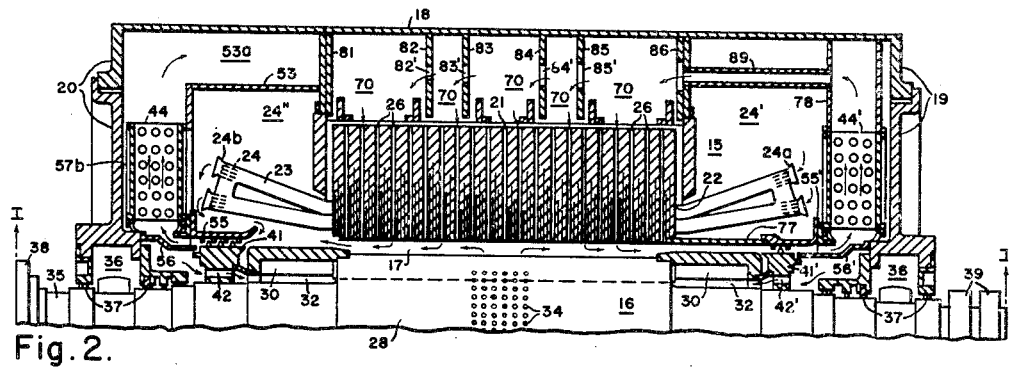
Figure 3:
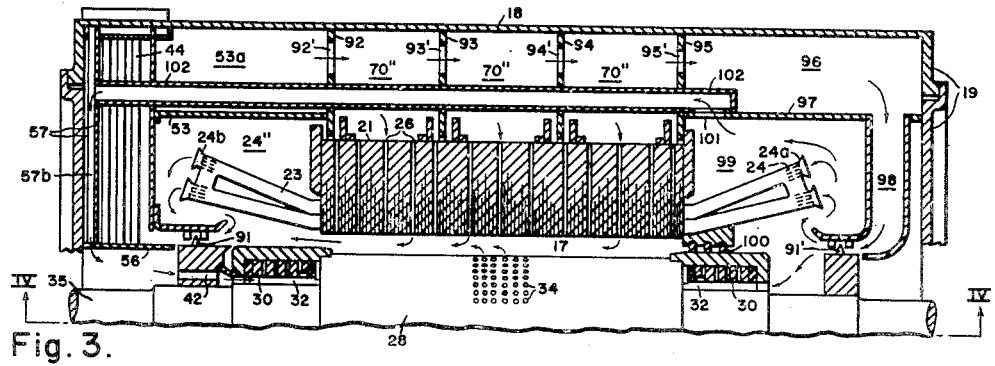
Figure 4:
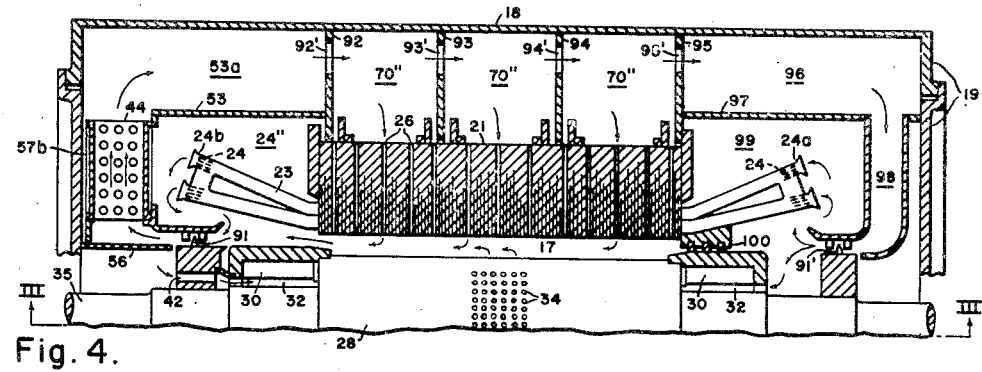

Figs. 1 and 2 are respectively vertical and horizontal sectional views, illustrative of a parallel-blower system, and Figs. 3 and 4 are similar views of a series-blower system, illustrative of our invention.

Figs. 1 and 2 show a turbine generator, which is illustrative of a dynamoelectric machine having a stator member 15 and a rotor member 16, separated by an air gap 17.

The stator member 15 includes a substantially gas-tight machine-enclosing housing, which comprises an outer cylindrical frame-shell or core-surrounding housing-portion 18, and two brackets 19 and 20, enclosing the respective ends of the outer frame-shell. The housing is filled with a gaseous filling, which is preferably hydrogen, at a gas-pressure which is adapted, at times, to be at least as high as 30 pounds per square inch, gauge, which may be regarded as a minimum pressure, as somewhat higher gas-pressures are contemplated. While hydrogen is preferred, it is possible to use other gases having a molecular weight lower than nitrogen, the low molecular weight being desirable in order to keep down the windage-losses resulting from the rotation of the rotor member 16 within the gas.

The stator member 15 also comprises a cylindrical stator-core 21, having a plurality of winding-receiving stator-slots 22. The stator member also comprises an inner-cooled stator winding 23 having coil-sides lying within the winding-receiving slots 22, and coil-ends lying beyond the respective ends of the stator-core 21. This stator winding 23 is an inner-cooled winding, having cooling-ducts 24 which are in good thermal relation to the stator-conductors, for substantially directly cooling said stator-conductors. The stator-winding cooling-ducts 24 have inlet-openings 24a at one end of the winding, and outlet-openings 24b at the other end.

A recirculating stator-winding cooling-system is necessarily provided, for recirculating a stator-winding cooling-fluid in said inner-cooling stator-winding ducts 24, said recirculating cooling-system including a means for cooling the stator-winding cooling-fluid. Although it is not necessary to use the gas which fills the machine-housing as the stator-winding cooling-fluid, we prefer to do so, in which case, the duct-inlets 24a are open to an end-space 24' within the machine, at one end of the machine, while the duct-outlets 24b are open to another end-space 24" within the machine at the other end of the machine, thus cooling the stator winding 23 with the gas which is enclosed within the machine-housing, said gas being cooled by the subsequently described coolers. The stator winding 23 is usually a polyphase winding, and in the large machine-sizes to which our present invention is particularly applicable, the stator winding 23 is provided with ground insulation which is good for 10,000 volts, or higher.

The stator-core 21 is also provided with a plurality of core-ventilating stator-ducts, which may be either radially disposed ducts or spaces 26, as shown in Figs. 1 to 4, or other suitable stator-core ventilating-ducts may be used.

The rotor member 16 has a cylindrical rotor core 28, which has a plurality of axially extending winding-receiving slots 29, and an inner-cooled rotor winding 30 having cooling-ducts 31 in good thermal relation to the rotor-conductors for substantially directly cooling said rotor-conductors. Preferably, or in practically every case in which our invention would be used, the rotor-winding cooling-ducts 31 have inlet-openings or means, 32, at the respective ends of the rotor winding, and outlet-openings at a plurality of intermediate discharge-points within the winding-receiving rotor-slots, these discharge-points being commonly grouped together near the center of the rotor-core, and being connected to the air gap 17 by a plurality of radially extending rotor ducts or holes 34 which discharge the rotor-cooling gas to the rotor-periphery. The rotor windings 30 are insulated for a voltage which is considerably lower than the stator windings 23, so as to require a much thinner rotor-insulation, which is too thin to be shown on the scale to which our drawings are drawn.

The rotor core 28 is carried by a rotor shaft 35, which is supported by a pair of bearing housings 36 near the respective frame-brackets 19 and 20, as shown in Figs. 1 and 2. Associated with the bearing-housings 36, are suitable gland-seal members 37 for maintaining gas-tight joints around the respective shaft-ends. One end of the shaft is connected to a coupling 38, whereby the machine may be connected to a turbine or other prime mover; while the other end of the shaft carries two slip rings 39 for exciting the rotor winding 30, which serves as the field-winding for the machine.

The air gap 17 has a single gap-length of the order of from three and one half to five inches, more or less, so that the air gap is sufficiently large to act as a hot-gas collecting-chamber and as an axial duct for a substantial portion of the ventilating-gas of the machine, as will be evident from the subsequent explanations.

It is necessary to provide a gas-moving means, for maintaining a circulation of the gas within the machine-enclosing housing 18—19—20. In accordance with our invention, we provide a multiple-pressure gas-moving means, for maintaining a circulation of the gas within the machine-enclosing housing 18—19—20. This gas-moving means preferably includes two blowers 41 and 41', one being carried by the rotor member 16 at each end of the rotor core 28. At least one of these blowers is directed so as to evacuate or exhaust hot gas from that end of the air gap 17. In the form of our invention which is shown in Figs. 1 and 2, both of the blowers 41 and 41' are exhaust-blowers of this description.

As shown in Figs. 1 and 2, each of the blowers 41 and 41' is provided with a supporting-means which has or provides one or more axially extending under-blower passages 42 or 42', near the rotor-shaft 35, the inner ends of these under-blower passages being in communication with the rotor-winding inlet-openings 32 at that end of the machine.

In Figs. 1 and 2, the blower 41 at one end of the machine, is a multistage axial blower or compressor, for developing a differential pressure-head suitable for driving the necessary quantities of cooling-gas through the ducts of the inner cooled stator and rotor windings 23 and 30; while the blower 41', at the other end of the machine, is a lower-pressure blower, shown as a single-stage blower, for creating the much smaller pressure-differential which is required for the stator-core ventilation.

Each of the blowers 41 and 41' discharges hot gases to a suitable heat-exchanging or cooling means. While these coolers could be disposed at any convenient place within the machine-housing 18—19—20, in carrying out our invention, we prefer to use the vertical-cooler arrangement which is described and claimed in the previously mentioned Baudry-Heller application. In describing this cooler-arrangement in Figs. 1 and 2 of the accompanying drawing, we will leave the numerals unprimed for the equipment at one end of the machine, and prime it for the equipment at the other, so that a single description will suffice for both equipments.

In the form of our invention shown in Figs. 1 and 2, the heat-exchanging means comprises a first pair of vertical coolers 44 and 45 which are disposed adjacent to the high-pressure blower 41, and a second pair of vertical coolers 44' and 45' which are disposed adjacent to the low-pressure blower 41'. These coolers are located axially between the stator-winding end-turns and the housing-bracket 20 or 19, as the case may be, at that end of the machine, as shown in the vertical sectional view, Fig. 1. The blowers 41 and 41' are disposed underneath, or within the axial confines of, the respective stator-winding end-turns. The high-pressure blower 41 discharges its hot gas axially toward the portion of the housing which is occupied by the first pair of coolers 44 and 45; while the low-pressure blower 41', at the other end of the machine, discharges its hot gas axially toward the portion of the housing which is occupied by the second pair of coolers 44' and 45'.

Both pairs of vertical coolers, 44 and 45, and 44' and 45', respectively, are located radially between the bearing housing 36 at its end of the machine and the outer frame-shell 18, as shown in the horizontal sectional view, Fig. 2. The hot gas which is discharged axially from each blower 41 or 41' divides into two streams, one stream flowing to the right, through the vertical cooler 44 or 44', as the case may be, while the other stream flows to the left, through the vertical cooler 45 or 45', as shown in the horizontal sectional view, which is Fig. 2.

Each of the coolers 44, 45, 44' and 45' comprises a plurality of substantially straight, vertical, liquid-cooled, finned pipes, each end of each cooler terminating in a cooler-head 47. The outer frame-shell 18 is provided with cooler-accommodations perforations 48, having pressure-resistant reinforcing means 51, which are secured to the frame-shell around each perforation 48. The top and bottom cooler-heads 47 of each cooler are hermetically but removably secured to their own reinforcing-means, so that each cooler can be lifted vertically out of the machine, after disconnecting its two cooler-heads 47.

We provide suitable hot-gas guiding-means, for guiding the hot gases to and through the blowers 41, 41', and thence to and through the coolers 44, 45 and 44', 45', respectively. Thus, the hot-gas end-winding space 24" into which the stator-winding duct-outlets 24b discharge is confined by an outer cylindrical or arcuate partition 53, a flat transverse plate or disc 54 which extends vertically between the first two coolers 44 and 45 on the sides thereof closest to the stator end-windings, and the shroud 55 of the blower 41. The transverse plate or disc 54 is provided with a central hole 54a which is more or less hermetically joined to the outer periphery of the blower-shroud 55.

Surrounding the inner end of the bearing, in the space between the first two vertically disposed coolers 44 and 45, there is a stationary funnel-like duct-member 56, the inner end of which comes into near contact with the rotating end of the blower 41, so that there is little gas-leakage at this point. This keeps the hot discharge-gases from the blower away from the inner end of the bearing, at the point where the discharged hot gases divide into two streams, flowing to the right and the left to enter the coolers 44 and 45, respectively.

Extending vertically between the two coolers 44 and 45, at their sides closest to the housing-bracket 20, there is a curved transverse plate or disc 57, which bulges or is curved, inwardly, toward the disc 54, and away from the housing-bracket 20. This curved transverse plate or disc 57 has a central hole 57a which is substantially hermetically sealed to the large end of the funnel-like member 56, so as to provide a separation between the hot gas which is flowing to the right and left between the two vertical coolers 44 and 45, and cold gas which flows radially inwardly in the flat end-space 57b between the curved plate 57 and the bracket 20, and then axially inwardly through the funnel-like member 56, into the under-blower passages 42, to ventilate that end of the rotor-windings, as will be subsequently described.

The large machine, which embodies our invention as illustrated in Figs. 1 and 2, uses a parallel-blower system, in which the blower 41 develops a high pressure-differential, which is used for the inner-cooling of the rotor winding 30, and for the inner-cooling of the stator winding 23; while the other blower, 41', develops a relatively lower pressure-differential, which is used for the cooling of the stator-core 21. The first pair of coolers, 44 and 45, cool the high-pressure gas which is delivered by the first blower 41; while the other pair of coolers, 44' and 45', at the other end of the machine, cool the gas which is delivered by the low-pressure blower 41'. This second pair of coolers, 44' and 45', may be of the same description as the first pair, 44 and 45, except that the second coolers may sometimes be somewhat smaller. The second pair of coolers, 44' and 45', use the same kind of baffling or partition-members as the first pair of coolers 44 and 45, as shown at 54', 55', 56' and 57', these parts corresponding to the correspondingdy numbered unprimed parts at the other end of the machine.

In order to segregate the suction-side of the low-pressure blower 41' from the high-pressure cool-gas end-space 24' which services the inner-cooled windings 23 and 30, the rotor-member is provided with a cylindrical baffle 77, which is secured to the periphery of the stator core 21 at that end of the machine, and which close to the blower-shroud 55' which surrounds the blower 41'.

As shown in the horizontal sectional view, Fig. 2, the cool-gas discharge-sides of the second pair of vertical coolers 44' and 45' are partitioned off from the high-pressure cool-gas end-space 24' by transversely disposed vertical barrier-plates 78, which are not present at the other end of the machine. As a consequence of the addition of these barrier-plates 78 as shown in Fig. 2, it is necessary to provide a communication-means between the high-pressure cool-gas end-space 24' and the underblower passages 42' at that end of the machine, by a means which is shown in the vertical sectional view, Fig. 1, this means including a plurality of ducts 79 between the plates 54' and 57', so that some of the high-pressure cooled gas is diverted or discharged from the end-space 24' which services the stator-winding duct-inlets 24a, and this high-pressure cooled gas is delivered through the ducts 79 to the flat end-space 57b' between the curved transverse plate or disc 57' and the housing-bracket 19, being thence delivered to the large end of the funnel-like member 56', and thence delivered to the under-blower passages 42' under the blower 41', to service that end of the inner-cooled rotor-windings 30.

In the large machine which is shown in Figs. 1 and 2, the stator-frame has six frame-rings 81 to 86, extending inwardly from the outer cylindrical frame-shell 18. These six frame-rings 81 to 86 are axially spaced from each other, within the axial length which is occupied by the stator core 21, the frame-rings 81 and 86 being more or less hermetically sealed with respect to the respective ends of the stator core.

The frame-ring 81 is secured to one end of the cylindrical or arcuate partition 53, which surrounds the hot-gas discharge-end space 24" of the stator-winding ventilation. The space 53a outside of this cylindrical or arcuate partition 53 is filled with cooled gas which is delivered by the two coolers 44 and 45. At the other end of the machine, the cylindrical or arcuate partition 53 is omitted, so that the high-pressure cool-gas end-space 24' extends all the way out to the outer frame-shell 18.

An essential or characteristic feature of the construction which is shown in Figs. 1 and 2 is the provision of an axially extending, peripherally disposed, through duct-means 88 (Fig. 1), to provide an axial communication from one end of the machine to the other. In the form of embodiment shown in Fig. 1, the through-duct 88 is illustrated as being in the space between the outer periphery of the stator core 21 and the outer frame-shell 18. This through-duct 88 carries the high-pressure cool gas, from the space 53a outside of the cylindrical or arcuate partition 53, to the end-space 24', which surrounds the stator-winding duct-inlets 24a.

The annular spaces 70" between successive frame-rings 81 to 86, as shown in Fig. 2, are in communication with each other, through openings 82' to 85' in the intermediate frame-rings 82 to 85, and the whole group of these annular spaces 70" is placed in communication with the output-sides of the low-pressure coolers 44' and 45', by means of ducts 89 (Fig. 2), extending from the barrier-plates 78 to the frame-ring 86. These annular frame-ring spaces 70" are also in communication with the outer peripheral ends of the radial stator-core ventilating-spaces 26.

The operation of the machine which is shown in Figs. 1 and 2 will now be apparent. The hot gas, from the discharge-end 24" of the stator windings 23, and from the same end of the air gap 17, is compressed to a high blower-pressure by the multistage exhaust-blower 41, and is delivered through the pair of coolers 44 and 45 to the high-pressure cool-gas space 53a which is outside of the cylindrical or arcuate partition 53 at that end of the machine. This high-pressure cool-gas space 53a is in communication with the rotor-winding inlet-openings 32 at that end of the machine, through the inwardly curved portion of the transverse plate or disc 57, as shown in Figs. 1 and 2; this air passing radially inwardly between this curved plate 57 and the housing-bracket 20, to the funnel-like member 56.

The high-pressure cool-gas end-space 53a, which is fed by the discharge-sides of the coolers 44 and 45, is placed in communication with the high-pressure cool-gas end-space 24' at the other end of the machine, as shown by the through-duct 88 in Fig. 1. This end-space 24' encloses the stator-winding duct-inlets 24a, so as to feed gas into these inlets, and it is in communication with the rotor-winding inlet-openings 32 at that end of the machine, through the ducts 79 and the flat end-space 57b' between the curved plate 57' and the housing-bracket 19. It will be noted that this high-pressure cool gas, for inner-cooling both the stator and rotor windings 23 and 30, is kept separate from the cool gas for ventilating the stator-core 21.

The stator-core ventilation, in Figs. 1 and 2, is obtained from the single-stage exhaust-blower 41', which draws the necessary quantity of hot gas out of that end of the air gap 17, and compresses it to a much lower blower-pressure than is obtained in the multistage blower 41. This compressed hot gas, from the single-stage blower 41', is delivered through the second pair of vertical coolers, 44' and 45'; and the discharge-sides of these coolers are placed in communication, by the ducts 89 in Fig. 2, with the annular spaces 70" between the successive frame-rings 81 to 86, these annular spaces 70" being in communication with the outer peripheries of all of the radial stator-core ventilating-spaces 26, which discharge their hot gases into the air gap, after cooling the stator-core 21. In this way, the necessary low pressure-differential, which is needed to provide the relatively small amount of stator-core cooling, which is necessary, is obtained from a low-pressure blower 41', thus avoiding the expense of first compressing that quantity of gas to the same high pressure-differential which is needed for the inner-cooling of the windings, and then throttling it down to the pressure-differential which is needed by the stator-core cooling-spaces.

The parallel-blower system which is shown in Figs. 1 and 2 is particularly adaptable for those turbine-generators which require gas-discharge from both ends of the air gap, because of limitations in the air-gap dimension, or limitations in the cooler-proportions, or for large machines where a single-discharge system might become impracticable.

A series-blower system, as shown in Figs. 3 and 4, is suitable for those turbine-generators in which a gas-discharge from only one end of the air gap is practicable, and where the savings in the blower-power requirements will justify the slight additional complication which is required by using two blowers in series with each other.

In Figs. 3 and 4, we show two blowers 91 and 91', one at each end of the rotor-core. Both of the blowers 91 and 91', in Figs. 3 and 4, are shown as single-stage blowers, because, as will subsequently appear, the two blowers are connected in series with each other, for producing the pressure-differential which is needed for the inner-cooling of the stator and rotor windings 23 and 30, whereas the stator-core cooling is obtained from the pressure-differential which is created by the blower 91 alone, as will subsequently appear.

Of these blowers 91 and 91', in Figs. 3 and 4, the blower 91 is an exhaust-blower, for evacuating gas out of that end of the air gap and also from the chamber 24" which receives the gas from the stator-winding duct-outlets 24b, as was the case with the multistage blower 41 in Figs. 1 and 2. This blower 91 is provided with the previously described under-blower passages 42, and it delivers its hot gas to a single pair of vertical coolers 44, with the same baffle or partition-arrangement which has already been described for the end of the machine which is bounded by the frame-bracket 20 in Figs. 1 and 2.

The stator member in Figs. 3 and 4 has four frame-rings 92 to 95, corresponding to the six frame-rings 81 to 86 of Figs. 1 and 2. Each of these frame-rings is perforated, as shown at 92' to 95', thus putting the cool-gas zones 53a, which surrounds the cylindrical or arcuate partition 53, into communication with a similar zone 96, which surrounds a cylindrical or arcuate partition 97 at the other end of the machine, that is, at the end which is bounded by the housing-bracket 19. The frame-ring perforations 92', 93' and 94' also put the first cool-gas zone 53a into communication with the annular frame-ring spaces 70" which are in communication with the outer peripheral ends of all of the radial ventilating-spaces 26 of the stator-core 21.

In Figs. 3 and 4, the second blower 91' blows the gas axially inwardly toward the stator and rotor cores 21 and 28. This blower 91' receives gas, on its intake side, through a passageway 98 which is in communication with the outer cool-gas zone 96 which surrounds the cylindrical or arcuate partition 97. The blower 91' adds its blower-pressure to that of the first-mentioned blower 91, thus creating a combined pressure-differential which blows the cooling gas into a high-pressure inner cool-gas zone 99, which is in communication with the stator-winding duct-inlets 24a and with the rotor-winding inlet-openings 32 at that end of the machine. The air gap 17, at this end of the machine, that is, adjacent to the inner cool-gas zone 99, is blocked, or nearly blocked, by a suitable annular or cylindrical baffle 100, such as is described and claimed in a patent No. 2,626,365, which was issued to the applicants Baudry and Heller on January 20, 1953.

As shown in Fig. 3, the cylindrical or arcuate partition 97, which constitutes the outer boundary of the high-pressure cool-gas zone 99, is provided with an outlet-opening 101, which is connected, through a through-duct 102 to the curved transverse plate or disc 57, thus transmitting the high-pressure cooling-gas to the flat end-space 57b between this plate or disc 57 and the frame-bracket 20, at the same end of the machine at which the coolers 44 are located, thus delivering the gas, through the funnel-like member 56 (shown as being cylindrical in Figs. 3 and 4), and through the under-blower passages 42, to the rotor-winding inlet-openings 32 at that end of the machine. The through-duct 102 in Fig. 3 is disposed in the annular space between the outer periphery of the stator core 21 and the outer cylindrical frame-shell 18, and it passes through suitable holes, which are provided especially for said duct in the frame-rings 92 to 95, as shown in Fig. 3.

In the operation of the form of embodiment of our invention which is shown in Figs. 3 and 4, it will be obvious that the first blower 91 receives all of the hot gas, and delivers it through the two vertical coolers 44 to the first cool-gas zone 53a at a pressure which is suitable for forcing the necessary amount of cooling-gas through the radial ventilating-ducts 26 of the stator core 21, these stator-ducts discharging their heated gases into the air gap 17. The rest of the partially pressurized cooling-gas, which is not diverted through the stator-core ducts 26, passes on, through the frame-ring perforation 95', to the outer zone 96, from which this gas enters the second blower 91', which adds its blower-pressure to that of the first blower 91, and thus creates a high-pressure cooling-gas, which is used to enter the stator-winding inner-cooling ducts 24 at that end of the machine, and to enter the rotor-winding inlet-openings 32 at both ends of the machine. The stator-winding ducts 24 discharge their heated gas into the hot-gas zone 24" which is in communication with the inlet side of the first blower 91. The heated rotor-winding cooling-gas is discharged through the discharge-openings 33 of the rotor-core, into the air gap 17, from which it is drawn to the intake side of the blower 91.

It will be seen that, in both illustrated forms of our invention, we provide two axial blowers or compressors, which are so disposed that they create two different pressure-differentials, one being the relatively small pressure-differential which is necessary for cooling the stator-core 21, and the other being the larger pressure-differential which is necessary for the inner-cooled stator and rotor windings 23 and 30.

It is to be understood that our invention is not limited to the precise forms of embodiment which have been chosen for the illustration of the principles of the invention; as many changes can be made, in the way of adding refinements, omitting unnecessary features, changes in shape and arrangement, and the substitution of equivalents, without departing from the essential spirit of the invention.

We claim as our invention:

1. A dynamoelectric machine having a stator member and a rotor member separated by an air gap; (a) said stator member having a cylindrical stator core having a plurality of axially extending winding-receiving stator-slots; and an inner-cooled stator winding, having coil-sides lying within the winding-receiving stator-slots, and having stator-winding cooling-ducts in good thermal relation to the stator-conductors for substantially directly cooling said stator-conductors; and said stator core also having a plurality of core-ventilating stator-ducts; (b) said rotor member having a cylindrical rotor core having a plurality of axially extending winding-receiving rotor slots; and an inner-cooled rotor winding having coil-sides lying within the winding-receiving rotor-slots; said rotor winding having rotor-winding cooling-ducts in good thermal relation to the rotor-conductors for substantially directly cooling said rotor-conductors; said rotor-winding cooling-ducts having inlet-openings at the respective ends of the rotor winding and having outlet-openings at a plurality of intermediate discharge-points within the winding-receiving rotor-slots; said rotor windings being insulated for a voltage which is considerably lower than said stator windings; and said rotor core having a plurality of radially extending rotor-ducts extending between the respective outlet-openings of the rotor-winding cooling-ducts and the air gap; (c) said stator member further including a substantially gas-tight machine-enclosing housing having a gaseous filling; (d) said air gap being sufficiently large to act as a hot-gas collecting-chamber and as an axial duct for a substantial portion of the ventilating-gas of the machine; (e) a gas-moving means, for maintaining a circulation of the gas within the housing (c), said gas-moving means including a blower carried by the rotor member at each end of the rotor core, at least one of said blowers being an exhausting blower which is so directed as to evacuate hot gas from that end of the air gap, at least the said exhausting blower including a supporting-means which provides an axially extending under-blower passage near the rotor-shaft, the inner end of said under-blower passage being in communication with the rotor-winding inlet-openings of item (b) at that end of the machine; (f) heat-exchanging means disposed within said housing (c); (g) said housing (c) having a core-surrounding housing-portion, surrounding the stator core, in combination with a means for providing a through duct-means extending axially from one end of the machine to the other; (h) a gas-circulation guiding-means, including: a hot-gas guiding-means for guiding the heated gas of the machine into at least a portion of said gas-moving means (e), and for thence delivering said heated gas first through said heat-exchanging means (f) for cooling said gas; a first cool-gas guiding-means, for guiding a first portion of the cooled gas from the heat-exchanging means, in a high-pressure gas-circulating system which circulates said cooled gas at a relatively high blower-pressure through the inner-cooling ducts of at least the rotor winding of item (b), said first cool-gas guiding- means including a gas-communication means, at one end of the housing (c), for placing said relatively high blower-pressure in communication with that end of the through duct-means (g), and a gas-communication means, at each end of the housing (c), for placing its end of said through duct-means in communication with the rotor-winding inlet-openings of item (b) at its end of the machine; and a second cool-gas guiding-means, for guiding a second portion of the cooled gas from the heat-exchanging means, in a low-pressure gas-circulating system which circulates said cooled gas at a relatively low blower-pressure through the core-ventilating stator-ducts of item (a); each of said first and second cool-gas guiding-means using only substantially the amount of gas-moving blower-power which is necessary to generate the gas-circulating blower-pressure required in that gas-circulating system; and (i) a recirculating stator-winding cooling-system, comprising: a means for recirculating a stator-winding cooling-fluid in said stator-winding cooling-ducts of item (a); and a means for cooling the stator-winding cooling-fluid.

2. A parallel-blower machine as defined in claim 1, characterized as follows: (e') the exhausting blower of item (e) being a relatively high-pressure blower which develops approximately the correct amount of blower-pressure required in the high-pressure gas-circulation system of item (h); and the other blower of item (e) being a relatively low-pressure blower which develops approximately the correct amount of blower-pressure required in the low-pressure gas-circulating system of item (h); and (h') the hot-gas guiding means of item (h) including a first suction-means for separately guiding the hot gas of the high-pressure gas-circulating system into the suction side of the high-pressure blower of item (e'), a second suction-means for separately guiding the hot gas of the low-pressure gas-circulating system into the suction side of the low-pressure blower of item (e'), and separate gas-delivery guiding-means for delivering the respective output-gases of the two blowers (e') first through different portions of the heat-exchanging means (f) for separately cooling said gases; the first portion of the cooled gas in item (h) being that which comes from the high-pressure blower and the corresponding portion of the heat-exchanging means (f); and the second portion of the cooled gas in item (h) being that which comes from the low-pressure blower and the corresponding portion of the heat-exchanging means (f).

3. A series-blower machine as defined in claim 1, characterized as follows: (e') the second blower of item (e) being directed so as to blow gas axially toward the rotor core of item (b); and (h') the hot-gas guiding-means of item (h) including a means for delivering all of the heated gas into the suction side of the exhausting blower of item (e), and a means for thence delivering said heated gas through said heat-exchanging means (f) for cooling said gas; the first cool-gas guiding-means of item (h) including a means for guiding a first portion of the cooled gas through a portion of the through duct-means (g) to the suction side of the second blower (e'), a means for providing a high-pressure zone in communication with the output side of said second blower (e'), a means for placing said high-pressure zone in communication with the rotor-winding inlet-openings at that end of the machine, a means for substantially blocking the air gap at the end adjacent to said high-pressure zone, and a means, including another portion of the through duct-means (g), for placing said high-pressure zone in communication with the outer end of the axially extending under-blower passage of the exhausting blower of item (e); and the second cool-gas guiding-means of item (h) including a means for guiding a second portion of the cooled gas through the core-ventilating stator-ducts of item (a) without passing through the second blower (e').

4. The invention as defined in claim 1, characterized as follows: (a') the core-ventilating stator-ducts of item (a) being radially extending stator-ducts having their outer ends extending to the outer periphery of the stator core of item (a); (g') said core-surrounding housing-portion (g) being also in combination with a means for providing an axially extending peripherally disposed core-ventilating passage in a space between the outer periphery of the stator core and said core-surrounding housing-portion (h), and a means for placing said passage in communication with the outer peripheral ends of substantially all of the radially extending stator-ducts (a'); and (h') the second cool-gas guiding-means of item (h) including a means for feeding the cooled gas into the peripherally disposed passage (g'), and a means for returning hot gas from the inner ends of said radially extending stator-ducts (a') to a suction side of at least a portion of the gas-moving means (e).

5. A parallel-blower machine as defined in claim 4, characterized as follows: (e') the exhausting blower of item (e) being a relatively high-pressure blower which develops approximately the correct amount of blower-pressure required in the high-pressure gas-circulation system of item (h); and the other blower of item (e) being a relatively low-pressure blower which develops approximately the correct amount of blower-pressure required in the low-pressure gas-circulating system of item (h); and (h') the hot-gas guiding-means of item (h) including a first suction-means for separately guiding the hot gas of the high-pressure gas-circulating system into the suction side of the high-pressure blower of item (e'), a second suction-means for separately guiding the hot gas of the low-pressure gas-circulating system into the suction side of the low-pressure blower of item (e'), and separate gas-delivery guiding-means for delivering the respective output-gases of the two blowers (e') first through different portions of the heat-exchanging means (f) for separately cooling said gases; the first portion of the cooled gas in item (h) being that which comes from the high-pressure blower and the corresponding portion of the heat-exchanging means (f); and the second portion of the cooled gas in item (h) being that which comes from the low-pressure blower and the corresponding portion of the heat-exchanging means (f).

6. A series-blower machine as defined in claim 4, characterized as follows: (e') the second blower of item (e) being directed so as to blow gas axially toward the rotor core of item (b); and (h') the hot-gas guiding-means of item (h) including a means for delivering all of the heated gas into the suction side of the exhausting blower of item (e), and a means for thence delivering said heated gas through said heat-exchanging means (f) for cooling said gas; the first cool-gas guiding-means of item (h) including a means for guiding a first portion of the cooled gas through a portion of the through duct-means (g) to the suction side of the second blower (e'), a means for providing a high-pressure zone in communication with the output side of said second blower (e'), a means for placing said high-pressure zone in communication with the rotor-winding inlet-opening at that end of the machine, a means for substantially blocking the air gap at the end adjacent to said high-pressure zone, and a means, including another portion of the through duct-means (g), for placing said high-pressure zone in communication with the outer end of the axially extending under-blower passage of the exhausting blower of item (e); and the second cool-gas guiding-means of item (h) including a means for guiding a second portion of the cooled gas through the core-ventilating stator-ducts of item (a) without passing through the second blower (e').

7. The invention as defined in claim 1, characterized as follows: (a') the core-ventilating stator-ducts of item (a) being radially extending stator-ducts extending between the outer periphery of the stator core and the air gap; (g') said core-surrounding housing-portion (g) being also in combination with a means for providing an axially extending peripherally disposed core-ventilating passage in a space between the outer periphery of the stator core and said core-surrounding housing-portion (h), and a means for placing said passage in communication with the outer peripheral ends of substantially all of the radially extending stator-ducts (a'); and (h') the second cool-gas guiding-means of item (h) including a means for feeding the cooled gas into the peripherally disposed passage (g').

8. A parallel-blower machine as defined in claim 7, characterized as follows: (e') the exhausting blower of item (e) being a relatively high-pressure blower which develops approximately the correct amount of blower-pressure required in the high-pressure gas-circulation system of item (h); and the other blower of item (e) being a relatively low-pressure exhausting blower, which is so directed as to evacuate hot gas from that end of the air gap, and which develops approximately the correct amount of blower-pressure required in the low-pressure gas-circulating system of item (h); and (h') the hot-gas guiding-means of item (h) including separate gas-delivery guiding-means for delivering the respective output-gases of the two blowers (e') first through different portions of the heat-exchanging means (e) for separately cooling said gases; the first portion of the cooled gas in item (h) being that which comes from the high-pressure blower and the corresponding portion of the heat-exchanging means (f); and the second portion of the cooled gas in item (h) being that which comes from the low-pressure blower and the corresponding portion of the heat-exchanging means (f).

9. A series-blower machine as defined in claim 7, characterized as follows: (e') the second blower of item (e) being directed so as to blow gas axially toward the rotor core of item (b); and (h') the hot-gas guiding-means of item (h) including a means for delivering all of the heated gas into the suction side of the exhausting blower of item (e), and a means for thence delivering said heated gas through said heat-exchanging means (f) for cooling said gas; the first cool-gas guiding-means of item (h) including a means for guiding a first portion of the cooled gas through a portion of the through duct-means (g) to the suction side of the second blower (e'), a means for providing a high-pressure zone in communication with the output side of said second blower (e'), a means for placing said high-pressure zone in communication with the rotor-winding inlet-openings at that end of the machine, a means for substantially blocking the air gap at the end adjacent to said high-pressure zone, and a means, including another portion of the through duct-means (g), for placing said high-pressure zone in communication with the outer end of the axially extending under-blower passage of the exhausting blower of item (e); and the second cool-gas guiding-means of item (h) including a means for guiding a second portion of the cooled gas through the core-ventilating stator-ducts of item (a) without passing through the second blower (e').

10. The invention as defined in claim 1, characterized as follows: (aa) the stator-winding cooling-ducts of item (a) having outlet-openings at a first end of the machine, and inlet-openings at the second end of the machine; (hh) the first cool-gas guiding-means of item (h) including a rotor-winding inner-cooling circulating-means for guiding a first portion of the high-pressure cooled gas of the high-pressure gas-circulating system through the inner-cooling ducts of the rotor winding of item (b), and a stator-winding inner-cooling circulating-means for guiding a second portion of said high-pressure cooled gas through the inner-cooling ducts of the stator winding of item (a); said stator-winding inner-cooling circulating-means including a gas-communication means for placing the relatively high blower-pressure in communication with the stator-winding inlet-openings of item (aa), at the same machine-end at which said relatively high blower-pressure is placed in communication with an end of the through duct-means (g), and a gas-communication means for placing the stator-winding outlet-openings of item (aa) in communication with the suction side of the blower at the machine-end at which said stator-winding outlet-openings are located; and (ii) the recirculating stator-winding cooling-system (i) being a part of the gas-circulating guiding-means (h) and (hh).

11. A parallel-blower machine as defined in claim 10, characterized as follows: (e') the exhausting blower of item (e) being a reatively high-pressure blower which develops approximately the correct amount of blower-pressure required in the high-pressure gas-circulation system of items (h) and (hh); and the other blower of item (e) being a relatively low-pressure blower which develops approximately the correct amount of blower-pressure required in the low-pressure gas-circulating system of items (h) and (hh); and (h') the hot-gas guiding-means of item (h) including a first suction-means for separately guiding the hot gas of the high-pressure gas-circulating system into the suction side of the high-pressure blower of item (e'), a second suction-means for separately guiding the hot gas of the low-pressure gas-circulating system into the suction side of the low-pressure blower of item (e'), and separate gas-delivery guiding-means for delivering the respective output-gases of the two blowers (e') first through different portions of the heat-exchanging means (f) for separately cooling said gases; the first portion of the cooled gas in item (h) being that which comes from the high-pressure blower and the corresponding portion of the heat-exchanging means (f); and the second portion of the cooled gas in item (h) being that which comes from the low-pressure blower and the corresponding portion of the heat-exchanging means (f).

12. A series-blower machine as defined in claim 10, characterized as follows: (e') the second blower of item (e) being directed so as to blow gas axially toward the rotor core of item (b); and (h') the hot-gas guiding-means of item (h) including a means for delivering all of the heated gas into the suction side of the exhausting blower of item (e), and a means for thence delivering said heated gas through said heat-exchanging means (f) for cooling said gas; the first cool-gas guiding-means of item (h) including a means for guiding a first portion of the cooled gas through a portion of the through duct-means (g) to the suction side of the second blower (e'), a means for providing a high-pressure zone in communication with the output side of said second blower (e'), a means for placing said high-pressure zone in communication with the stator-winding inlet-openings and the rotor-winding inlet-openings at that end of the machine, a means for substantially blocking the air gap at the end adjacent to said high-pressure zone, and a means, including another portion of the through duct-means (g), for placing said high-pressure zone in communication with the outer end of the axially extending under-blower passage of the exhausting blower of item (e); and the second cool-gas guiding-means of item (h) including a means for guiding a second portion of the cooled gas through the core-ventilating stator-ducts of item (a) without passing through the second blower (e').

13. The invention as defined in claim 10, characterized as follows: (a') the core-ventilating stator-ducts of item (a) being radially extending stator-ducts having their outer ends extending to the outer periphery of the stator core of item (a); (g') said core-surrounding housing-portion (g) being also in combination with a means for providing an axially extending peripherally disposed core-ventilating passage in a space between the outer periphery of the stator core and said core-surrounding housing-portion (h), and a means for placing said passage in communication with the outer peripheral ends of substantially all of the radially extending stator-ducts (a'); and (h') the second cool-gas guiding means of item (h) including a means for feeding the cooled gas into the peripherally disposed passage (g'), and a means for returning hot gas from the inner ends of said radially extending stator-ducts (a') to a suction side of at least a portion of the gas-moving means (e).

14. A parallel-blower machine as defined in claim 13, characterized as follows: (e') the exhausting blower of item (e) being a relatively high-pressure blower which develops approximately the correct amount of blower-pressure required in the high-pressure gas-circulation system of items (h) and (hh); and the other blower of item (e) being a relatively low-pressure blower which develops approximately the correct amount of blower-pressure required in the low-pressure gas-circulating system of items (h) and (hh); and (h') the hot-gas guiding means of item (h) including a first suction-means for separately guiding the hot gas of the high-pressure gas-circulating system into the suction side of the high-pressure blower of item (e'), a second suction-means for separately guiding the hot gas of the low-pressure gas-circulating system into the suction side of the low-pressure blower of item (e'), and separate gas-delivery guiding-means for delivering the respective output-gases of the two blowers (e') first through different portions of the heat-exchanging means (f) for separately cooling said gases; the first portion of the cooled gas in item (h) being that which comes from the high-pressure blower and the corresponding portion of the heat-exchanging means (f); and the second portion of the cooled gas in item (h) being that which comes from the low-pressure blower and the corresponding portion of the heat-exchanging means (f).

15. A series-blower machine as defined in claim 13, characterized as follows: (e') the second blower of item (e) being directed so as to blow gas axially toward the rotor core of item (b); and (h') the hot-gas guiding-means of item (h) including a means for delivering all of the heated gas into the suction side of the exhausting blower of item (e), and a means for thence delivering said heated gas through said heat-exchanging means (f) for cooling said gas; the first cool-gas guiding-means of item (h) including a means for guiding a first portion of the cooled gas through a portion of the through duct-means (g) to the suction side of the second blower (e'), a means for providing a high-pressure zone in communication with the output side of said second blower (e'), a means for placing said high-pressure zone in communication with the stator-winding inlet-openings and the rotor-winding inlet-openings at that end of the machine, a means for substantially blocking the air gap at the end adjacent to said high-pressure zone, and a means, including another portion of the through duct-means (g), for placing said high-pressure zone in communication with the outer end of the axially extending under-blower passage of the exhausting blower of item (e); and the second cool-gas guiding-means of item (h) including a means for guiding a second portion of the cooled gas through the core-ventilating stator-ducts of item (a) without passing through the second blower (e').

16. The invention as defined in claim 10, characterized as follows: (a') the core-ventilating stator-ducts of item (a) being radially extending stator-ducts extending between the outer periphery of the stator core and the air gap; (g') said core-surrounding housing-portion (g) being also in combination with a means for providing an axially extending peripherally disposed core-ventilating passage in a space between the outer periphery of the stator core and said core-surrounding housing-portion (h), and a means for placing said passage in communication with the outer peripheral ends of substantially all of the radially extending stator-ducts (a'); and (h') the second cool-gas guiding means of item (h) including a means for feeding the cooled gas into the peripherally disposed passage (g').

17. A parallel-blower machine as defined in claim 16, characterized as follows: (e') the exhausting blower of item (e) being a relatively high-pressure blower which develops approximately the correct amount of blower-pressure required in the high-pressure gas-circulation system of items (h) and (hh); and the other blower of item (e) being a relatively low-pressure exhausting blower, which is so directed as to evacuate hot gas from that end of the air gap, and which develops approximately the correct amount of blower-pressure required in the low-pressure gas-circulating system of items (h) and (hh); and (h') the hot-gas guiding-means of item (h) including separate gas-delivery guiding-means for delivering the respective output-gases of the two blowers (e') first through different portions of the heat-exchanging means (f) for separately cooling said gases; the first portion of the cooled gas in item (h) being that which comes from the high-pressure blower and the corresponding portion of the heat-exchanging means (f); and the second portion of the cooled gas in item (h) being that which comes from the low-pressure blower and the corresponding portion of the heat-exchanging means (f).

18. A series-blower machine as defined in claim 16, characterized as follows: (e') the second blower of item (e) being directed so as to blow gas axially toward the rotor core of item (b); and (h') the hot-gas guiding-means of item (h) including a means for delivering all of the heated gas into the suction side of the exhausting blower of item (e), and a means for thence delivering said heated gas through said heat-exchanging means (f) for cooling said gas; the first cool-gas guiding-means of item (h) including a means for guiding a first portion of the cooled gas through a portion of the through duct-means (g) to the suction side of the second blower (e'), a means for providing a high-pressure zone in communication with the output side of said second blower (e'), a means for placing said high-pressure zone in communication with the stator-winding inlet-openings and the rotor-winding inlet-openings at that end of the machine, a means for substantially blocking the air gap at the end adjacent to said high-pressure zone, and a means, including another portion of the through duct-means (g), for placing said high-pressure zone in communication with the outer end of the axially extending under-blower passage of the exhausting blower of item (e); and the second cool-gas guiding-means of item (h) including a means for guiding a second portion of the cooled gas through the core-ventilating stator-ducts of item (a) without passing through the second blower (e').

References Cited in the file of this patent

UNITED STATES PATENTS

| | | |
|---|---|---|
| 2,217,431 | Baudry | Oct. 8, 1940 |
| 2,573,670 | Moses | Oct. 30, 1951 |